United States Patent [19]
Gullickson

[11] 3,885,490
[45] May 27, 1975

[54] SINGLE TRACK SIGHT AND SOUND MUSICAL INSTRUMENT INSTRUCTION DEVICE

[76] Inventor: Cecil F. Gullickson, 2018 Fosgate Dr., Winter Park, Fla. 32789

[22] Filed: Feb. 1, 1973

[21] Appl. No.: 328,657

[52] U.S. Cl. .................................................. 84/470
[51] Int. Cl. ............................................ G09b 15/00
[58] Field of Search ............ 84/470, 477, 478; 35/6, 35/8 A, 9 R, 9 A; 307/247

[56] References Cited
UNITED STATES PATENTS

| | | | |
|---|---|---|---|
| 2,892,103 | 6/1959 | Scarbrough | 307/247 R |
| 3,227,814 | 1/1966 | Ferris et al. | 179/100.1 |
| 3,377,716 | 4/1968 | Schmoyer | 84/478 |
| 3,403,591 | 10/1968 | Weitzner | 84/485 |
| 3,404,392 | 10/1968 | Sordello | 340/174.1 C |
| 3,482,480 | 12/1969 | Decker | 84/478 |
| 3,604,299 | 9/1971 | Englund | 84/1.03 |
| 3,664,036 | 5/1972 | Boswell et al. | 35/6 |
| 3,724,097 | 4/1973 | Schmoyer | 35/6 |
| 3,731,582 | 5/1973 | Gullickson | 84/478 |

OTHER PUBLICATIONS

Gray: Applied Electronics, John Wiley & Sons, Inc., New York, April 1958, pp. 697–698.

*Primary Examiner*—Lawrence R. Franklin
*Attorney, Agent, or Firm*—Julian C. Renfro

[57] ABSTRACT

A sight and sound instructional device for use with certain musical instruments, including keyboard instruments and fretted instruments, involving the use of illumination means associated with certain keys or frets of such instruments, in conjunction with means sensitive to certain coded information and connected to turn on the illumination means upon such information being received by a binary sequential decoding system utilized herein. This arrangement is particularly suitable for use by a beginning musician inasmuch as by the use of this invention, he or she can see certain keys or frets illuminated at such time as the decoder means receives the preascertained information. One preferred embodiment of this invention involves the use of instructional tapes containing voice instruction for the beginning musician recorded on a single magnetic tape track, said track also containing recorded coded information for causing keys or frets appropriate to the instruction to be illuminated at the proper time. Other facets of my invention include the tapes containing tempo information such that an automatic rhythm player that may be a part of a keyboard instrument can have its tempo controlled to match that of the instructional musical information also contained on the tape.

2 Claims, 9 Drawing Figures

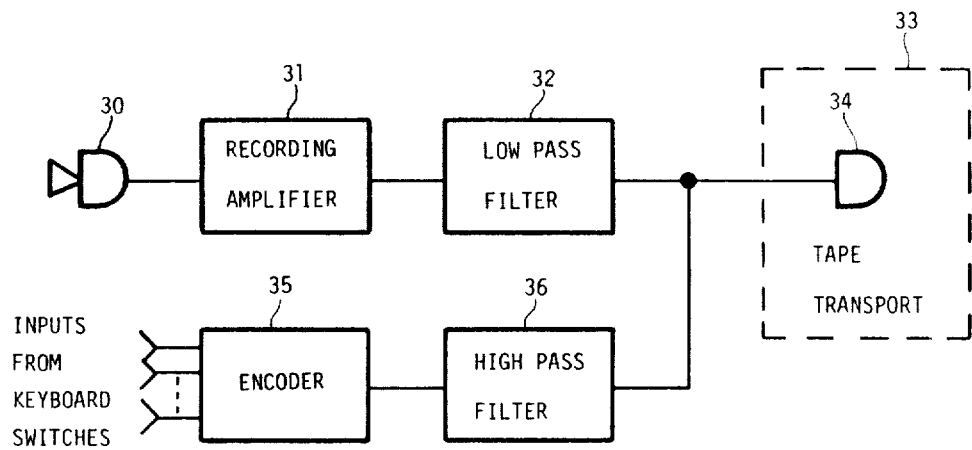
FIG. 2
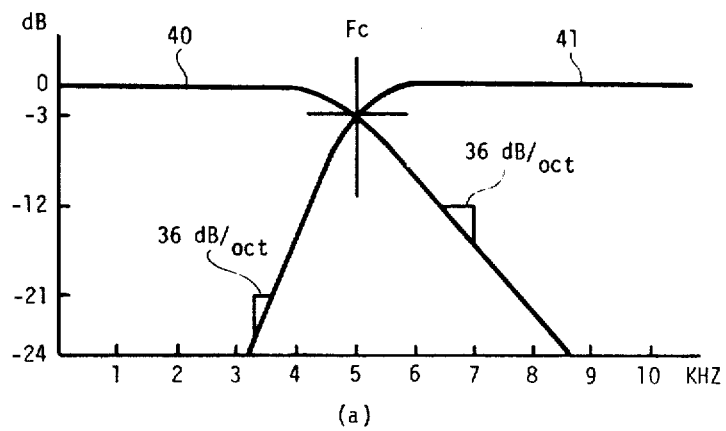
(a)
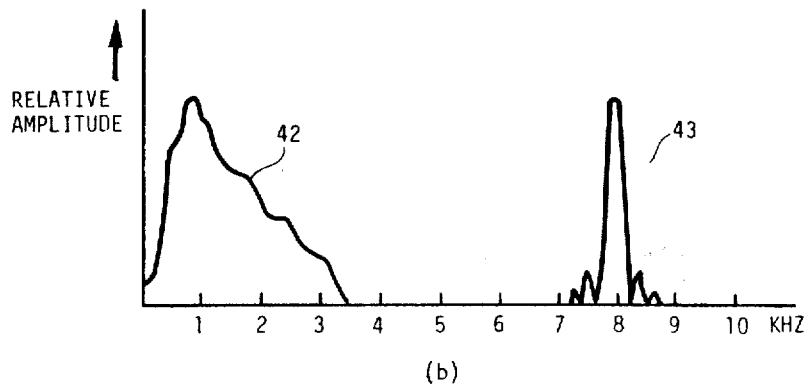
(b)
FIG. 3

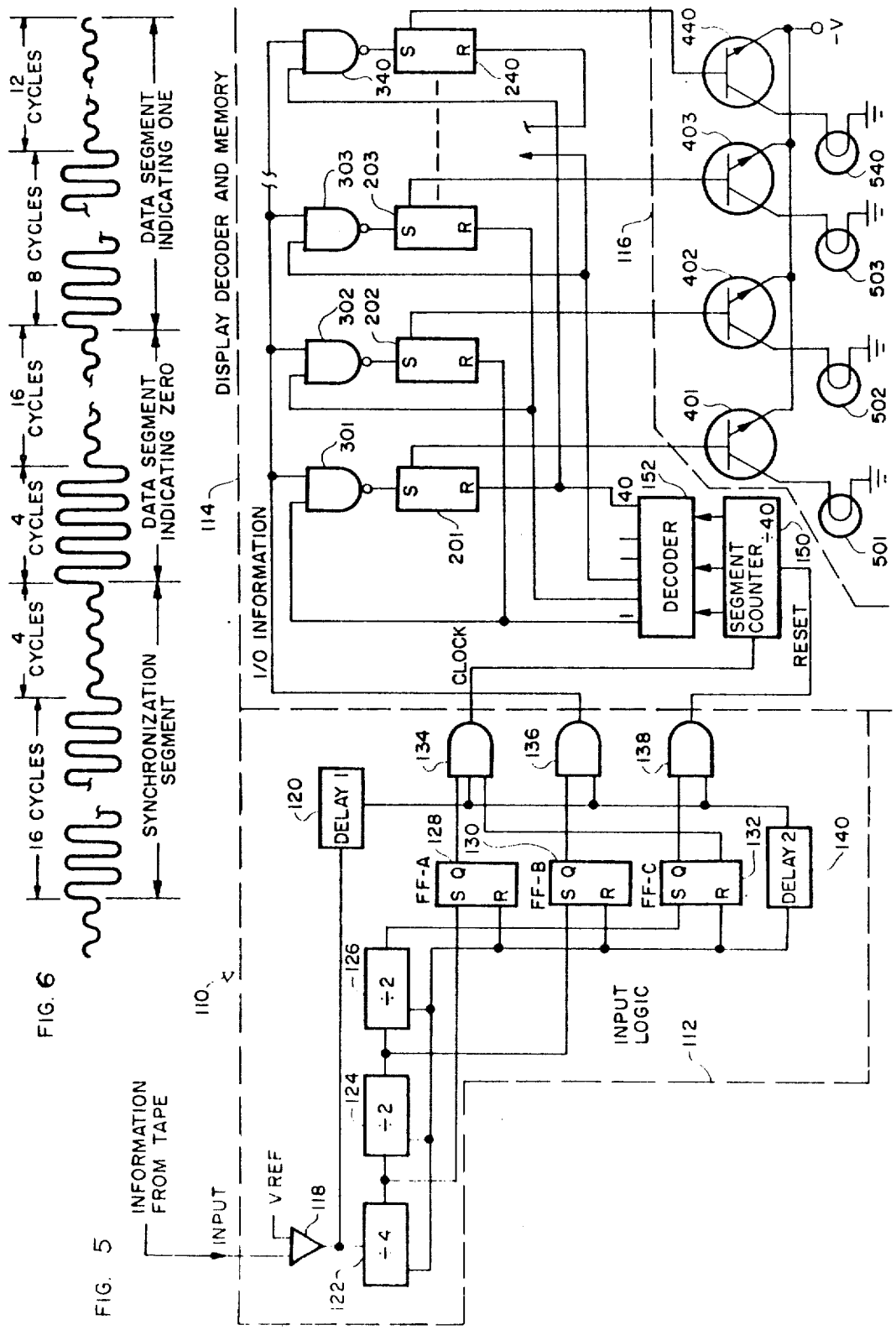

SINGLE TRACK SIGHT AND SOUND MUSICAL INSTRUMENT INSTRUCTION DEVICE

REFERENCE TO RELATED INVENTION

This invention is related to my patent entitled "Music Teaching Aid", U.S. Pat. No. 3,415,152, which issued Dec. 10, 1968; to my application entitled "Sight and Sound Teaching Aid for Keyboard Instruments", Ser. No. 54,733, filed July 14, 1970, now U.S. Pat. No. 3,731,582; and to my co-pending application entitled "Sight and Sound Musical Instrument Instruction," Ser. No. 182,484 filed Sep. 21, 1971 now U.S. Pat. No. 3,837,256.

BACKGROUND OF THE INVENTION

1. Field of the Invention

This invention pertains to aids to be used by an amateur musician when learning to play a keyboard or fretted instrument, so that he or she can be instructed as to the precise location of keys or frets that are to be associated with certain frequencies or melodies.

2. DESCRIPTION of the PRIOR ART

A number of aids for use with keyboard instruments have been proposed in the past, but these have usually been either comparatively ineffective, or else have been large and expensive. Certain tapes have been available that contained specific instruction as to the manner in which the beginning musician placed his hands on the keyboard, and some of these tapes have even contained tones such that the student could ascertain when he had selected the proper note to be played. Other tapes have contained accompaniments such that the student could play along with the tape, with the melody he provided hopefully blending with the accompaniment the tape was supplying.

Other more elaborate means have been proposed which would entail the use of an instructor's keyboard and a student's keyboard utilized in conjunction with a tape playing arrangement. Some advantages are made possible by such an arrangement, such as the instruction being able to interpose additional teaching assistance over and above that being presented by the tape. However, few purchasers can afford the expense involved in an arrangement of this type, and the space necessitated by such a device is so great as to make it impractical for use in the average home.

In the invention described in my co-pending application, Ser. No. 182,484, referred to above, an arrangement is provided for indicating to the student the location of certain keys by illumination in response to recorded coded information and utilized in conjunction with recorded voice instructions. In accordance with that invention a stereo or double track tape player is used wherein the coded information is pre-recorded on one of the two tape tracks and the voice instruction is pre-recorded on the other tape track.

SUMMARY OF THIS INVENTION

This invention represents a highly satisfactory yet quite economical arrangement for indicating to beginning musicians the precise locations of certain keys on the keyboard of a musical instrument, which keys, when struck in response to the illumination thereof, bring about the student playing a simple or eventually a complicated melody. Further, the frets of a stringed instrument can likewise be selectively illuminated so as to provide instruction. The illumination means is activated by a decoder that is arranged to receive coded information from a prerecorded magnetic tape, such as a cassette type tape. Thus, in response to the decoder means being subjected to certain information contained on the tape, the illumination means associated with the keys or frets are caused to be illuminated in a manner appropriate to the playing of a selected melody.

Although this invention can be put to a wide range of uses, a preferred arrangement involves utilization in conjunction with an instructional tape that is pre-recorded to contain aural instructional information as well as accompanying coded information, with latter information causing the sequential illumination of the lighting means associated with certain keys or frets of the instrument. The instructional tape in the present invention is advantageously a single track type with means provided for effectively separating the coded information and the audio (aural) instructional information. Thus, I have effectively provided two channels of information on a single magnetic tape track.

As should quickly become apparent, this amounts to a sight and sound instruction such that a vocal recording can explain to the student the technique that is to be developed, and the keys or frets illuminated at an appropriate time so as to unerringly indicate the location of the keys or frets upon which the student should place his or her fingers in order to bring about the playing of the chosen piece of music.

Quite obviously, this invention can be utilized with a wide range of instruments, including piano, harpsichord, and organ, and can include the illumination of either or both keyboards of the organ, and even include the bass pedals that may be involved. Similarly, my invention can provide indication of certain functional operations, such as adjustment of the tab stops, and alerting the organist of forthcoming chord changes. Fretted instruments utilizing this invention can of course include guitar, banjo and ukulele.

In contrast to the invention described in my application, Ser. No. 182,484, in which a dual-track tape is used, my present invention requires only one tape track and one tape head. Advantages that obtain from this improvement are that a lower cost tape player may be used, more information can be recorded on a given size tape reel or cartridge, and a greater width of the tape can be used, minimizing occurrences of dropouts and errors in signals.

My present invention provides an additional improvement over the invention of my application Ser. No. 182,484 relating to the application of my instant invention to organs or other instruments providing electronic automatic rhythm players. In such instruments, the basic rhythm pattern is commonly derived from an electric clock whose frequency is adjusted by controls on the instrument console, I advantageously provide means herein for automatically disconnecting the internal clock from its associated automatic rhythm circuits and substituting clock pulses derived from signals generated in the decoder of my invention. These means are responsive to control and clock data recorded in the coded information channel of the magnetic tape. This improvement allows the student to utilize the internal rhythm section of his instrument operating in synchromism with the instructional tape. In contrast, without this improvement, use of the built-in automatic rhythm device during playing of an instructional tape would not be feasible due to the inevitable drift between the internal clock controlling the rhythm circuits, and the timing of the illumination means derived from the tape as well as the music and voice recorded thereon.

In contrast with certain other prior art arrangements, the practice of my invention entails the use of no additional keyboards requiring the presence of the instructor, and because the present sight and sound instruction amounts to such a highly effective technique, it is possible for the beginning musician to be playing recognizable melodies at a much faster rate than was ever previously possible. The instructional tapes can be played either by a tape player built into the keyboard instrument, or alternatively, by an ancillary piece of equipment. Quite obviously, the tape can be played over and over at the behest of the student until such time as he or she has mastered each portion of the melody.

In the typical instance, the tape is a magnetic tape played on an appropriate tape player. As indicated, I use a single track tape in which the voice instruction, and the electronic data utilized for contemporaneously bringing about the illumination of certain selected keys or frets as a helpful supplement to the spoken instruction are recorded simultaneously on the single track.

There are obviously a wide variety of ways in which my sight and soung instructional technique can be utilized in the home for instructing a student in the playing of a musical instrument. In the interests of providing an arrangement which is practical and economical and that can be afforded by the average home, I preferably utilize cassette type tapes, with the tape player either being separate or built into the musical instrument itself.

In order to extract the coded information prerecorded upon the tape and utilize it in the most straightforward manner for the selective illumination of the bulbs, I preferably utilize a binary sequential decoding system involving input logic, display decoder and memory, with latter being connected to suitable display and drivers. Preferably, the tape is prerecorded with data in the form of a 8 KHz sinusoidal carrier wave containing sequential binary width modulated data. The 8 KHz frequency is an advantageous frequency for the carrier, being well above the upper limit of frequencies required for intelligible voice reproduction, as will be clear from a discussion hereinafter of my two channel filter. Two separate amplitudes are normally involved, with a smaller one being the carrier and the larger amplitude representing data to be interpreted and utilized by the aforementioned decoding system. Suitable means are utilized to extract synchronization type information contained on the tape, which information is employed to assure proper operation.

In one exemplary arrangment, I divide each 1/10 of a second on the tape into 40 equal length modulated segments, with one of these being concerned with synchronization. Hence, I can easily control 39 display elements, such as may include illumination means under or adjacent two or so octaves of keys, or adjacent certain organ stops and even associated with the bass pedals in order that the student will be instructed in a most dynamic manner.

Selected segments can also be used to control the tempo of an automatic rhythm player in an organ so equipped and to automatically switch such player from manual tempo control to pre-recorded tape control. Although the illumination means can be ordinary incandescent bulbs of small size, such means can also include light emitting diodes or the like. Alternatively, the memory circuit can be connected to control certain instrument functions instead of a display or illumination means as described above. A typical application of this feature of my invention is in the control of automatic rhythm device, built into the instrument, by clock pulses derived from the recorded data on the magnetic tape.

As described above, in addition to the 8 KHz coded sine wave recorded on the tape, voice instruction and/or accompanying music is also recorded simultaneously on the same track. To prevent interaction or interference between the data recording and the audio recording, the upper frequency of the audio signal is restricted during recording. For example, it is well known that highly intelligible speech signals can be reproduced with an upper frequency limit of 4 to 5 KHz. Thus, I preferably utilize a low pass filter in the output of the voice recorder, having an upper cut off frequency selected in the range of 4 to 5 KHz. To ensure that low frequency noise and components from the data signal recording does not interfere with the voice recording, I preferably utilize a high-pass filter in the output of the data recorder, with advantageously selected low frequency cutoff on the order of 5 KHz.

In a like manner, my invention utilizes means associated with the tape player, the decoding system and the audio system to prevent interaction or interference between the voice recording playback and the data information playback. The preferred means is in effect a two channel filter comprising a low pass and a high pass filter having a common input and separate outputs. Preferably, a low pass filter is utilized in the voice playback channel having a selected upper cut off frequency approximately the same as the filter used during recording. Similarly, the data playback channel utilizes a high pass filter having a selected lower cut off frequency approximately the same as the filter used during recording. While I prefer low pass and high pass filters for separation of the voice channel and the data channel, it is clear to one skilled in the art that other types of filters may be used. For example, band pass filters covering the spectral bands of the voice and data respectively are suitable. Similarly, notch filters and band rejection filters may be used. Such variations are, of course, within the scope of my invention.

Also within the scope of my invention is described an alternative embodiment, also requiring only a single magnetic tape track. In this embodiment, the instructor in preparing the tape initially provides voice description of the forthcoming visual indication of notes to be played. During this time, only audio information is recorded, which may include demonstrations of the notes, chords and other points. Upon completing the comments or demonstrations, the instructor then plays the desired keys, thereby recording coded instructional data on the tape without audio. This cycle of audio instruction and coded visual instruction may then be repeated as desired.

On playback, in accordance with my invention, the audio signals are distributed to the audio amplifier and speaker arrangement to provide the desired aural instruction. At such times as the audio information is being played from the tape, the input to the decoder is effectively switched off to prevent accidental illumination of any lamps, since this is undesired at this point. At the time that the audio information stops and the coded visual information appears, the audio channel is effectively switched off and the decoder input is switched on.

A preferred embodiment of this facet of my invention involves separation means placed between the tape player output, and the audio input and decoder input comprising an analog switch in the audio channel, and a high pass filter in series with an analog switch in the decoder channel. The two analog switches are controlled by a retriggerable one-shot multivibrator triggered by data signals appearing at the output of the high pass filter. With audio signals present at the tape output, the one-shot multivibrator is in its quiescent condition and is connected to the audio analog switch such that this switch is closed, and to the data analog switch such that this switch is open. It may be easily seen that the tape audio output then appears at the audio amplifier as desired. The high pass filter prevents any audio energy from appearing in the data channel, having its lower cut off frequency on the order of 5 KHz. Upon cessation of the audio and appearance of the 8 KHz modulated data carrier at the tape player output, this energy is passed by the high pass filter to the data analog switch and the one-shot multivibrator in parallel. The data detector produces a triggering signal to the one-shot multivibrator causing the one-shot multivibrator to change to its second state. The one-shot multivibrator outputs then turn the audio analog switch off and the data analog switch on. This action applies the coded visual information to the decoder and blocks the audio amplifier from noise and interference during the visual instructional period.

When the coded data stops and aural information reappears, the data detector output ceases and the one-shot multivibrator resets again turning the audio channel on and the data channel off.

As should now be apparent, it is the primary object of my invention to provide musical instruments with a single track magnetic tape unit such that both aural and visual instruction may be contemporaneously furnished to a beginning musician, utilizing only the original keyboards, chord buttons, or frets inherent in the instrument design.

It is still another object of my invention to provide an illuminated keyboard or fret arrangement whose illumination means are selectively operated at a most economical manner in concert with aural (audio) instruction, with both the means for causing selective illumination and the aural instruction being contained on one track of a magnetic tape.

It is yet another object of my invention, when used with an instrument having an internal automatic rhythm device, to provide means for synchronizing such rhythm device with the tempo of the instructional information recorded on a magnetic tape.

It is a further object of my invention to provide musical instruction with alternating aural instruction and visual instruction.

It is yet a further object of my invention to provide a visual indication to the student immediately prior to a change in chord structure in the instructional program.

These and other objects, features and advantages will become more apparent from a study of the appended drawings in which:

FIG. 2 is a simplified block diagram of a recording system for producing an instructional tape having both aural instructions and control information for visual instruction means recorded on a single track, in accordance with my invention;

FIG. 3 is a plot of the frequency responses of preferred low pass and high pass filters superimposed along with relative amplitude spectra of recorded voice signals and visual instructional data, such filters usable in both recording and playback systems to prevent interaction between the voice signals and the data signals;

FIG. 5 is a functional block diagram of the logic circuits, display decoder and memory arrangement utilized in accordance with this invention;

FIG. 6 is a view of the waveform of the preferred coded information signal recorded on the magnetic tape in accordance with my invention;

DETAILED DESCRIPTION

Figure 1:
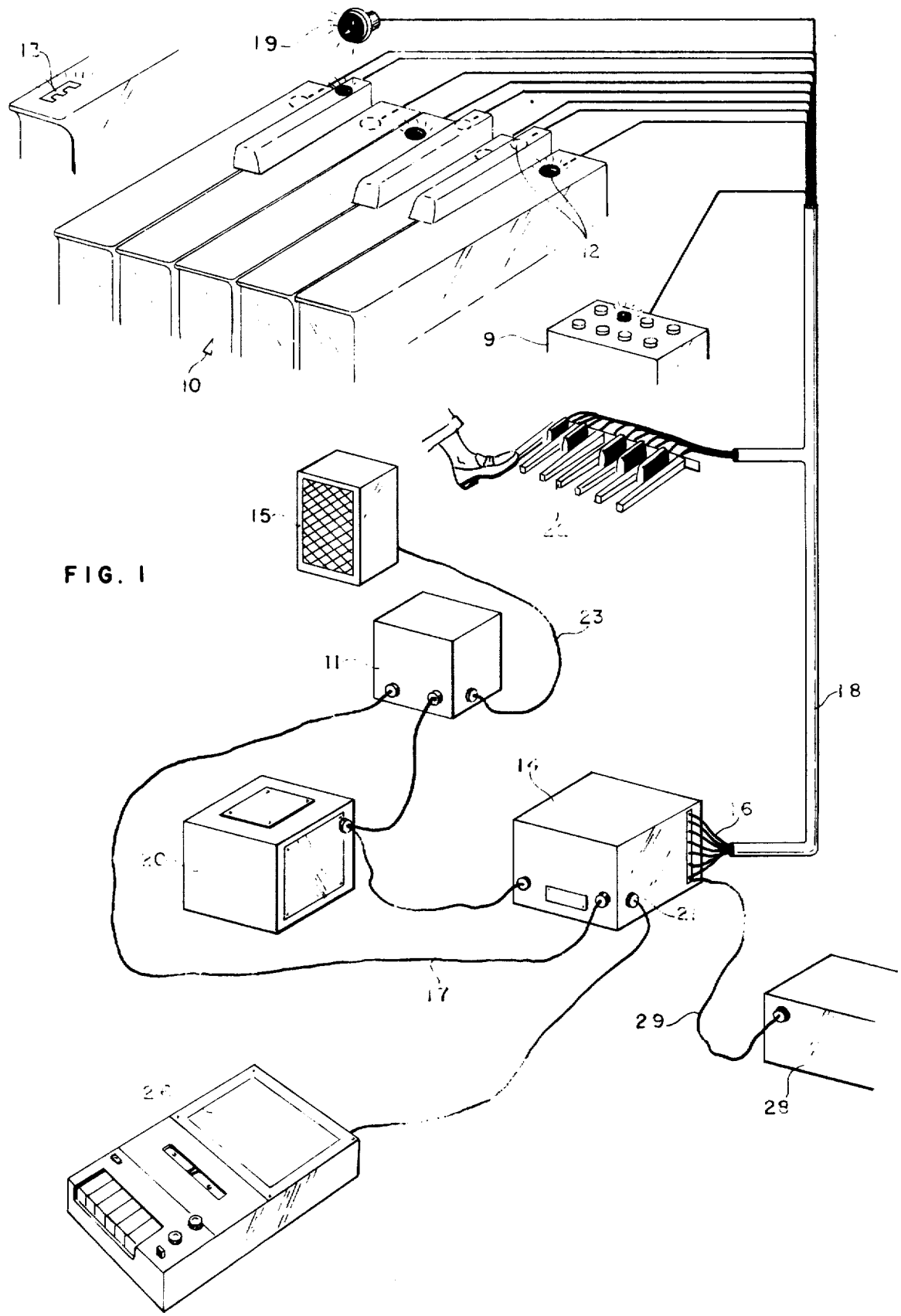
FIG. 1 is a schematic representation of the basic interrelationships among the illuminated keyboard of a musical instrument, the optically illuminated bass pedals of such instrument, a chord change signal, chord buttons, a decoder and other components in accordance with this invention, and a tape player representing the preferred type of input means for the decoder.

Turning to FIG. 1, it will be seen that in this exemplary embodiment of this invention, I have shown a portion of the keyboard 10 of a keyboard instrument upon which instruction is to be provided to a player, who may be a beginning musician. This instrument may of course be a piano, organ, or the like. The illustrated keyboard section represents a plurality of black and white keys, with each of these keys being equipped with an illumination source. For example, individual bulbs may be contained within the confines of the keys in approximately the positions indicated at 12, such that when illuminated, these bulbs clearly indicate to the student which key or group of keys is to be struck. The illumination means may be disposed below certain indicia, such as under the letter E as shown at 13 in the fragmentary view adjacent the keyboard portion 10. Wires are preferably used for carrying current from the decoding system to the illumination means.

Obviously, I am not to be limited to this arrangement, for the illumination means can be in the form of a light bar disposed above the upper rear portion of the keys, or for that matter any of a number of other individually operable illumination means can be utilized such that the keys to be struck by the student can be clearly indicated. Reference should be had to my patent entitled "Music Teaching Aid", U.S. Pat. No. 3,415,152, which issued Dec. 10, 1968 for additional pertinent details.

Most significantly, a multi-channel decoder 14 having a number of output terminals 16 is provided in FIG. 1, with the arrangement being such that each wire connected to each illumination means is also connected to a respective terminal of the decoder, this being accomplished through an electrical cable 18. The output terminals 16 also include connections for cable 29 that is wired into an optional automatic rhythm device 28 (an integral part of the musical instrument). Thus, when the circuit associated with a given bulb or group of bulbs is caused to close in accordance with the operation of my invention, an electrical current is caused to flow to the selected bulbs, to cause the illumination thereof for the benefit of the student. Similarly, when the circuits associated with cable 29 and rhythm device 28 are caused to close in response to control signals in accordance with my invention, the tempo of the rhythm device is synchronized with that of the instructional information. An appropriate power supply 20 connected to the multi-channel decoder 14 is provided to supply the current that passes through the illuminating means.

Although a number of different decoders could be utilized, I prefer to use a decoder 14 utilizing a binary sequential decoding system that will be discussed in greater detail hereinafter, and it should now suffice to say that the multi-channel decoder 14 comprises input logic, display decoder and memory, with latter being connected to suitable display drivers. Thus, upon the decoder receiving at its input 21, certain binary information from single track cassette tape player 26, it operates in a specific and predictable manner so as to bring about the illumination of specific ones of the illuminating means associated with the keys. It should be noted that the foot operated bass pedals 22 may contain illumination means, preferably mounted on the organ cabinet immediately above each pedal. When other binary information is received by decoder 14 the rhythm device 28 is thereby synchronized with the tempo of the illumination of the keys.

Although I could utilize a standard size player, I prefer to utilize a cassette type tape player, utilizing tapes containing aural (audio) instruction as well as coded information for providing visual indication of the keys to be played. In accordance with one of the purposes of my invention, the aural instruction and coded information are advantageously recorded on a single magnetic tape track, allowing a simple, low cost tape player having a single head to be used.

Decoder 14 includes two channel filter means for separating the voice signals and the coded information signals. The audio output from the filter means drives audio amplifier 11 through cable 17, the amplifier feeding loudspeaker 15 via cable 23. While the use of a loudspeaker is usually preferred, it is clear that earphones or other types of audio transducers could be used.

In addition to illumination of keyboard keys, a signal lamp 19 can be installed in a conspicuous spot, preferably just above the melody keys normally played with the right hand. This lamp is advantageously controlled to light just prior to a change of left hand chord key lamp illumination, and thus provides functional information that alerts the beginning student to glance toward his left hand preparatory to a change in chord note structure.

Also shown in FIG. 1 is a chord button box 9, such as utilized in some organs to play a complete chord by depressing a single button. For such instruments, lamps can be mounted within the buttons to indicate when such buttons are to be operated.

As should now be apparent, the beginning musician can obtain a prerecorded instructional tape that will contain aural instruction that he or she can hear, such as over the loudspeaker 15, and by virtue of my invention, he or she can also see certain keys of the keyboard illuminated, thus specifically indicating which keys should be struck at a certain time in order to bring about the playing of a chord or melody forming a part of the taped instruction. When the instrument is equipped with an automatic rhythm device 28, the student may utilize such device to provide rhythmic accompaniment along with his elementary manual playing, thereby providing entertaining motivation to the beginner.

It is of course necessary to prevent the modulated 8 KHz data signal present on the single tape track from appearing in the voice amplifier, for such would represent an annoyance to the listener. Similarly, the voice signals should not appear in the recovered data channel, which could cause errors in the decoder. Therefore, shown in FIG. 2 is a block diagram of an exemplary arrangement to be used during recording of tapes for use in my invention. Microphone 30 feeds recording amplifier 31 in conventional fashion. The output from amplifier 31 drives low pass filter 32. Referring momentarily to FIG. 3, curve 40 illustrates a preferred frequency response for filter 32. The cutoff frequency Fc is preferably at 5 KHz and the roll off is preferably at a rate of 36 dB per octave. A typical relative voice spectrum is shown as curve 42, with little energy above 3–4 KHz. Thus the filter curve will not significantly affect the voice quality, but noise, clicks and other frequency components which might fall near the data carrier frequency are effectively blocked.

Returning now to FIG. 2, the output of low pass filter 32 drives record tape head 34 on tape transport 33. To record the illumination control data, a preferred method is to utilize a keyboard provided with contact switches. The instructor plays the desired melody or exercise, thereby closing the associated keyboard switches. As shown in FIG. 2, the keyboard switches provide inputs to encoder 35 which generates an 8 KHz carrier modulated to represent the playing of desired notes in a manner to be described in detail hereinafter. The 8 KHz carrier with its associated side bands shown by curve 43 in FIG. 3 is impressed on high pass filter 36, which also drives record head 34. Curve 41 illustrates a preferred frequency response for high pass filter 36. The lower cutoff frequency Fc is preferably 5 KHz with a 36 dB/octave roll off. Filter 36 effectively prevents the recording of any low frequency noise or lower side band energy from the data signal, thus ensuring a clean voice signal.

While I have shown certain preferred cutoff frequencies and roll off rates for the low pass and high pass filters, it should be clear that other values could perhaps be used equally well, and may be desirable for certain uses.

Figure 4:
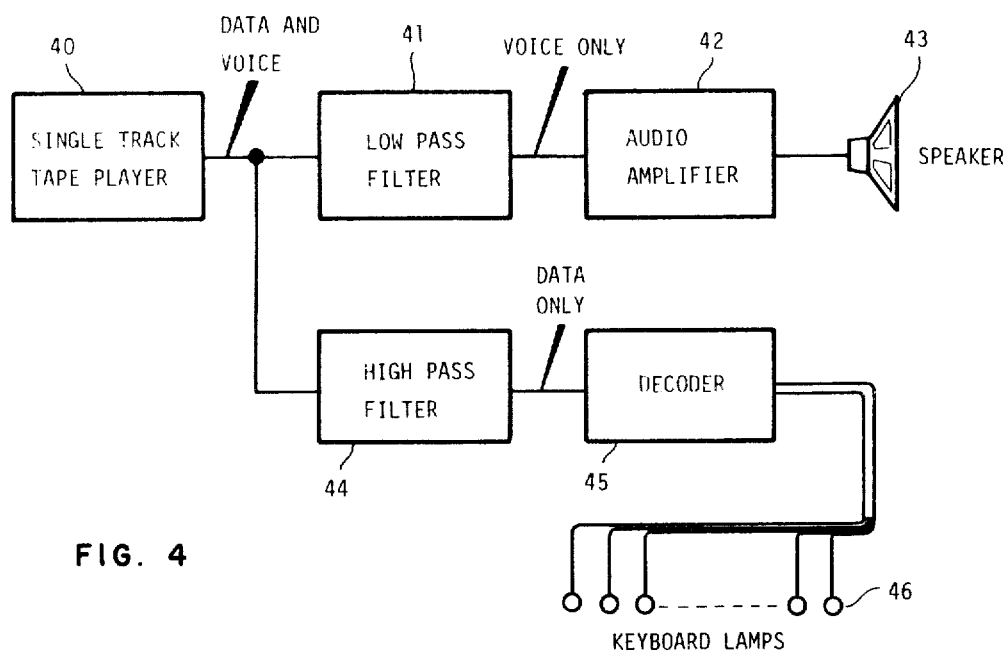
FIG. 4 is a simplified block diagram of the tape playback system used in accordance with my invention.

Turning to FIG. 4, a preferred arrangement for recovering the recorded coded instructional information and voice signals is illustrated. A single-track magnetic tape player 40 feeds two filters in parallel, low pass filter 41 and high pass filter 44. The responses of these filters are preferably identical with that shown in FIG. 3. The output of low pass filter 41 is the audio associated with the aural channel, since the higher audio frequencies associated with the data recording are effectively blocked. This output drives audio amplifier 42 and speaker 43. The output of high pass filter 44 contains only the 8 KHz data signal, since the lower frequencies are effectively blocked. The data signal is processed by decoder 45 to control keyboard lamps 46 in accordance with the recorded instructional information.

Relating the simplified schematic of FIG. 4 with the exemplary arrangement of FIG. 1, it may be easily understood that the tape player depicted by block 40 represents cassette player 26, filters 41 and 44 and decoder 45 are contained in decoder box 14, audio amplifier 42 and speaker 43 correspond to amplifier 11 and speaker 15 respectively. Similarly, the keyboard lamps 46 represent lamps used at 12 and 22.

Turning now to FIG. 5 wherein I show a block diagram relating to the decoder utilized with my invention, it will be noted that I have indicated at 110 a binary sequential decoding system utilizing input logic 112, and a display decoder and memory 114, with the latter being connected to the display and drivers 116.

The previously discussed tape player is arranged to play a tape upon which pre-recorded digital information has been placed. The input information from the tape is amplified and processed so that a set of square wave signals is obtained when the signal therefrom is in the high amplitude condition. Data and sync signals are each provided by the tape. The comparator 118 of the input logic 112 is utilized to square signals when they appear above a designated amplitude, so that the remainder of the processing may be accomplished digitally.

As will be seen hereinafter, this portion of my invention nominally separates each 1/10th of a second into 40 equal segments, facilitating the control of 39 display elements to be utilized with an electronic organ or other such instrument. A segment is used for synchronization to verify each time a frame begins. The occurrence of frame sync may also be displayed to indicate that the system is functioning.

With regard to the input information put on the tape during the encoding procedure, the data input is in the form of an 8 KHz sinusoidal carrier wave containing sequential binary width and amplitude modulated data. As will be seen in FIG. 6, the recorded sine wave has two separable amplitudes, with the smaller being the carrier and the larger amplitude being the data. The first segment, which represents sync, has a duration of 16 cycles. With one of the 40 segments being used for sync, this leaves 39 segments for information. FIG. 6 makes clear a number of the relationships utilized herein.

Frame sync has a high amplitude for 2 ms, leaving 4 cycles of 8 KHz at the low amplitude before the next word. Each segment has a duration of 2.5 ms as derived from 20 cycles of the carrier. Each segment contains either 4 or 8 cycles of high amplitude information in order to maintain a clock on the decoder.

With regard to the output of the comparator 118 of FIG. 5, a square wave is delivered to a delay 120 and to a divide-by-four device 122 if the sine wave is above a certain threshold (normal carrier level). The first pulse of every segment out of comparator 118 will drive the delay circuit 120 and cause it to generate a single pulse after 2.25 milliseconds.

It is possible that my invention will be used in conjunction with a variable speed tape recorder, and in that instance, it is desirable for the delay 120 to be a counter whose input is keyed to the tape speed, such that the time delay output will always sample the data at the correct or desired time, independent of tape speed. This arrangement facilitates the user operating the equipment at a low speed when initially learning a new sequence, and as his or her proficiency increases, the tape speed may be increased accordingly, without readjustment of the processor or decoder. Such counter may be a so-called preset counter so that a prescribed number of cycles will bring about an output. It should be noted that the reduction in speed possible will be limited by the low frequency cut off of the high pass filter associated with the playback system. Also, if the reduction in speed is significant, the voice channel audio frequencies will be reduced excessively producing distorted voice; therefore the voice channel amplifier should be cut off during this mode of operation.

Data is derived from the sequence of width and amplitude modulated segments of the 8 KHz carrier by noting the number of cycles above the threshold level, and to this end I provide the divide-by-four device 122, and two divide-by-two devices 124 and 126 in order to detect the width of the data in each segment.

The divide-by-four device 122 provides a pulse out when four pulses have been applied, and this device 122 may of course be a dual flip-flop, having the designation MC853P. Thus, when the number of pulses detected reach four, the output of device 122 will set flip-flop 128 (flip-flop A) and is selected to represent a zero, indicative of an OFF condition for the illumination means.

Similarly, when eight pulses have been detected, the device 124 will cause the flip-flop 130 (flip-flop B) to be set, and this is to be interpreted to mean that the width of the pulse is sufficient to be considered as a segment representing a ONE, indicative of an ON condition for the illumination means. If the pulse has sufficient width to be sync pulse, eight more pulses will be detected, causing the divide-by-two device 126 to set flip-flop 132 (flip-flop C).

Assuming at this point that all three flip-flops A, B and C are in the set position, this is the longest data period involved and constitutes frame sync. Since this is two milliseconds long, and the delay period is 2.25 milliseconds long, the delay will sample gates 134, 136 and 138 during the off period in all cases. The frame sync signal is used to reset the segment counter 150 to synchronize the decoder outputs with the information on the tape.

0.25 milliseconds prior to the beginning of any segment, the information in flip-flops A, B and C 128, 130 and 132) is used to drive the display decoder and memory. A pulse from the delay device 120 enables gates 134, 136 and 138 to generate the clock, I/O information, and reset, respectively. Gate 134 being connected to the output of flip-flop 128 causes an output to be given at the end of each data segment, except the output is inhibited during the synchronization segment which furnishes the reset pulse.

As will be apparent, gate 136 is connected to flip-flop 130 and generates an output if device 130 is set, and gate 138 generates an output if fkip-flop 132 is set. It should be noted that a connection is provided such that the clock output of gate 134 is inhibited if flip-flop 132 is set.

After the data for the past segment has been translated into I/O data and clock. or reset, the output of delay 120 is further delayed by delay 140 to provide enough time for gates 134, 136 and 138 to react before resetting all flip-flops in the input logic 110.

It will be noted from the drawing that the clock output from gate 134 and the reset output from gate 138 are connected to the divide-by-40 counter 150, which serves as a segment counter, with the output from latter device being sent to the decoder 152. It will be noted that the segment counter and decoder arrangement contains gates and flip-flops to distribute data to the appropriate display device. The decoder serves to decode the divide-by-40 output into 40 equal time segments, with each bit representing a data segment.

It should now be apparent that when flip-flop 132 is set, the output of gate 138 resets the divide-by-40 counter to count No. 1, which is designated as the frame sync interval.

As intended to convey in FIG. 5, 40 wires emanate from the decoder 152, with each wire going positive during its designated time slot. It is important to note that when flip-flop 130 is in the set position, the output of gate 136 serves to drive gates 301, 302, 303 . . . 340, with these gates being enabled sequentially by the output of decoder 152.

If an output occurs on one of the gates 301, 302, 303, etc., the associated flip-flop 201, 202, 203, etc. will be set. The output of the decoder 152 is so wired to the flip-flops as the reset them during the segment preceding the period where it may be set. The number one output of the decoder 152 will therefore enable gate 301 and reset flip-flop 202.

The flip-flops 201 through 240 drive transistors 401, 402, 403 . . . 440 respectively, which in turn are connected to display elements 501, 502, 503 . . . 540. These display elements may of course be deployed in or adjacent the keys of the organ, the stop tabs, the bass pedals, or on other musical instruments such as the frets of a stringed instrument.

It is clear that these display elements may be used for other advantageous instructional purposes. For example, a lamp 19 can be mounted above the melody keys in a region where the right hand would normally be deployed and designated as a "chord change" indicator. One of the segments is allocated to this function and the ON code is recorded in such segment just prior to a change in chord notes played by the left hand. This lamp alerts the beginning student to glance at his left hand and to be prepared to shift his fingers.

As will now be apparent, at the beginning of each data segment, either 4 or 8 cycles of 8 KHz data will be received, depending upon whether the associated key was pressed during the encoding procedure, with it of course also being apparent that the display device, such as a bulb or light-emitting diode (LED) associated with a given key, stop or pedal may remain on throughout a number of cycles of operation of the aforementioned device, depending of course upon the length of time the associated key was depressed during the time the tape was being recorded.

Figure 7:
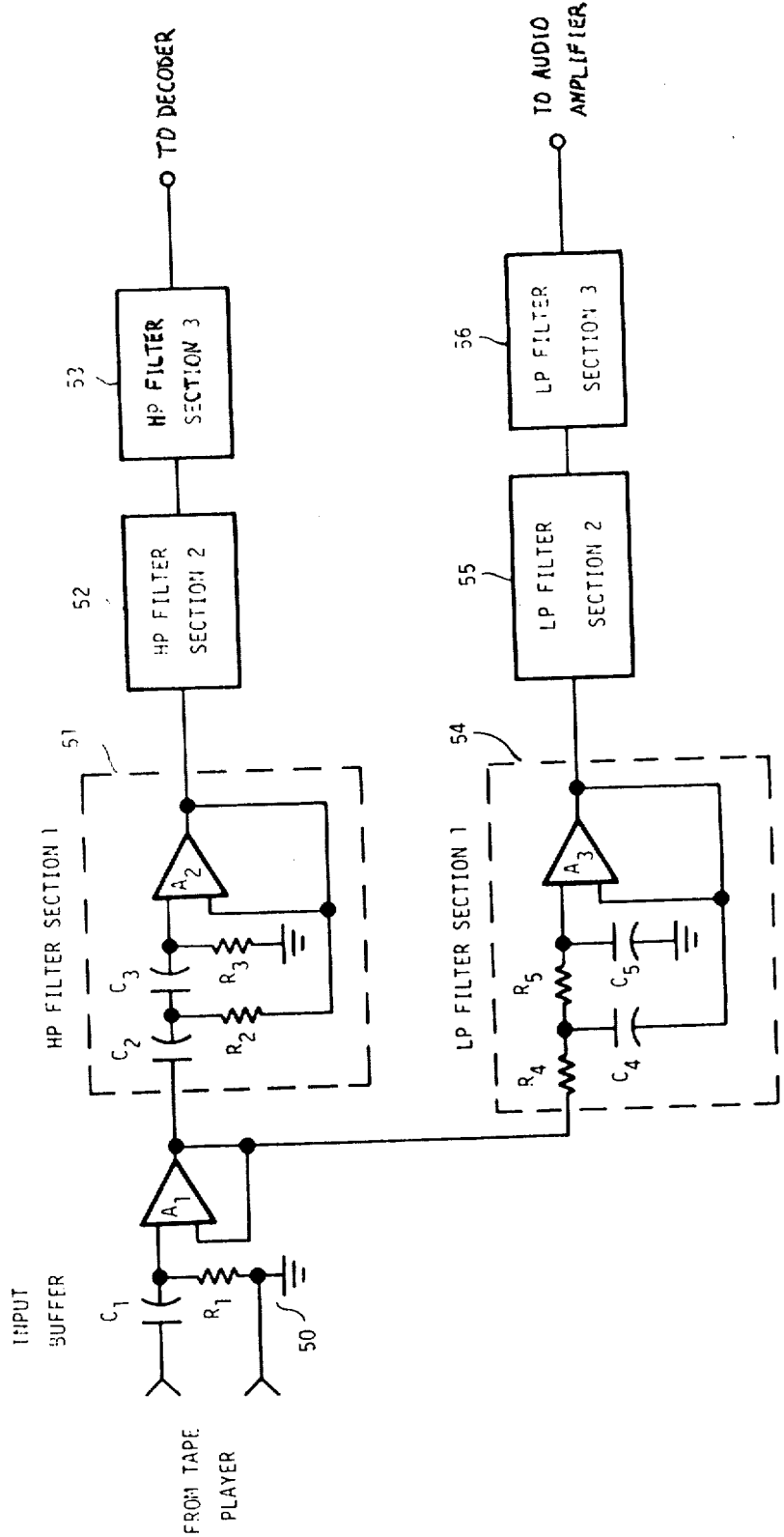
FIG. 7 is a circuit diagram of preferred low pass and high pass filters for use with my invention.

Turning now to FIG. 7, a diagram of a set of exemplary filters having the response characteristics illustrated in FIG. 3 are shown. It is to be understood that these filters may be used for both recording and playback. An input buffer 50 provides amplification and drive for the filters. Amplifier $A_1$ is preferably an integrated circuit amplifier such as SN72741. The high pass filter consists of three sections 51, 52, 53 of a two pole active filter, with the circuit being shown in Section 1 51. I prefer this circuit due to its low cost and small size as compared to lumped constant LC-type filters, but latter could, however, be utilized if desired. Similarly, the low pass filter comprises three sections 54, 55, 56 of a two pole active filter with the circuit shown in Section 1 54. Typical values of the components of the filters are given hereinafter in Table 1. The output of the low pass filter, Section 3 56 drives the audio amplifier, and the output of the high pass filter Section 3 53 drives the decoder input logic 112 shown in FIG. 5. In some instances I prefer to interpose a buffer amplifier between the high pass filter and the input logic. Such amplifier is provided with an automatic gain control circuit to maintain a constant maximum level into the logic, ensuring clean squaring of the 8 KHz data signaling for binary processing. This type of amplifier is well known in the prior art and any suitable type is applicable.

Figure 8:
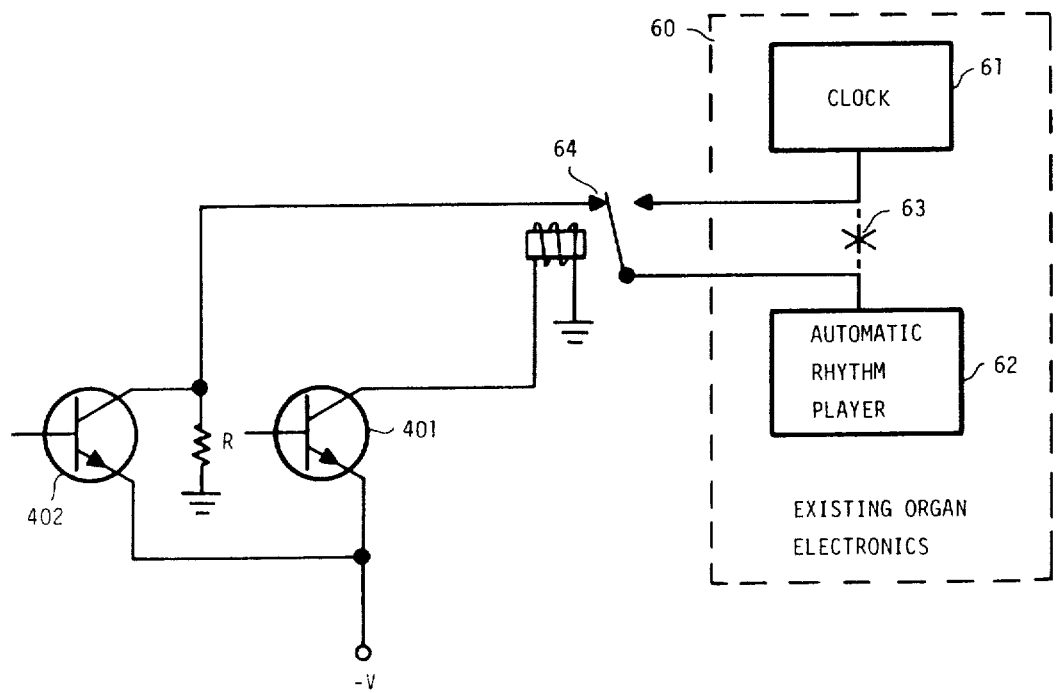
FIG. 8 is a simplified diagram of the control of an automatic rhythm player from clock pulses and switching signals derived from data recorded on the magnetic tape.

An optional feature of my invention is a means for synchronizing the tempo of an automatic rhythm player with the tempo of the instructional data when the instrument contains such a device. FIG. 8 illustrates an example of such control means. The electronic section 60 of an organ is shown containing an automatic rhythm player 62 normally controlled by an internal clock 61. In normal use, the rate of clock 61 is adjusted by the musician by means of controls on the organ/console to produce the particular rhythm and tempo desired. In accordance with my invention, the clock input connection to the rhythm player 62 is broken as at point 63, and the leads connected externally to the contacts of relay 64 as shown. When relay 64 is not energized, the back contacts are closed and normal organ operation is maintained. However, when it is desired to utilize the rhythm player in conjunction with an instructional tape, appropriate control signals are prerecorded on the tape. For example, in FIG. 8, a continuous ONE is recorded in the code segment controlling transistor driver 401 (see also FIG. 5). In this embodiment, driver 401 is connected to coil of relay 64 rather than lamp 501. In response to the continuous ONE condition of this segment, relay 64 closes, transferring the clock input of rhythm player 62 to driver 402. Driver 402 utilizes resistor R as a load instead of lamp 502. A clock signal is recorded in the code segment controlling driver 402 such that the clock rate corresponds to the tempo of the instructional information. As driver 402 alternately conducts and cuts off in response to the recorded clock, a square wave train is developed across resistor R and drives rhythm player 62 through the front contacts of relay 64, thereby controlling the rhythm tempo without regard to the organ console control setting.

Figure 9:
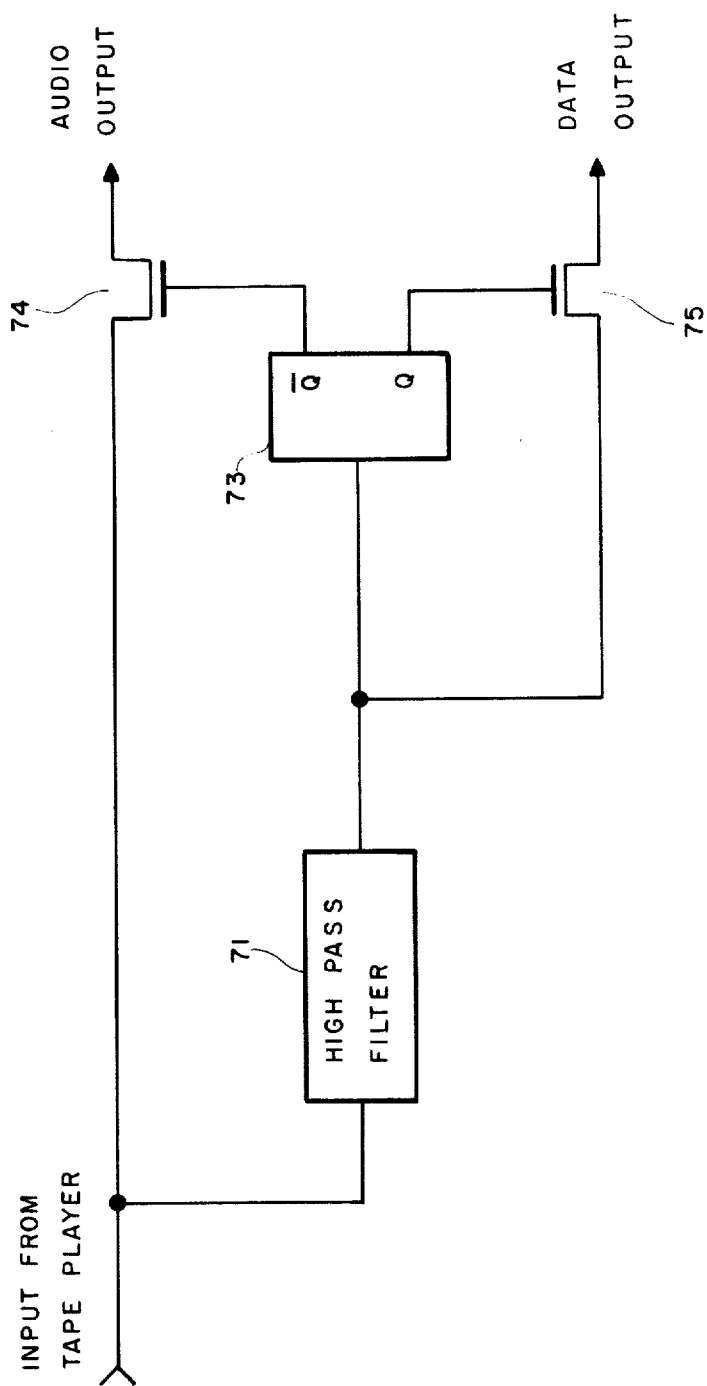
FIG. 9 is a simplified diagram of a preferred control for automatically separating aural information and coded visual information for the case wherein such information is alternately recorded on the tape.

Another facet of my invention, involving still the use of a single track magnetic tape, may entail recording the aural instructional material and the coded visual instructional material in alternating sequential parts of the tape track. In this embodiment, the two channels are never recorded simultaneously and the aural signals are passed through a low pass filter with a cutoff frequency lower than 8 KHz to prevent interference with the data decoder. FIG. 9 illustrates a preferred embodiment of the means for separating the aural channel and the visual channel during playback of such tape. The input from the tape player feeds the audio amplifier through analog switch 74, which may be a type NS543. The input from the tape player also is connected to high pass filter 71 which may utilize the high pass sections 51, 52, 53 of FIG. 7. The filter 71 output of FIG. 9 feeds the input logic 112 of FIG. 5 through analog switch 75, which may also be a type NS 543. The output of high pass filter 71 also drives the trigger input of one-shot multivibrator 73 which may be a type SN74123. One-shot 73 multivibrator has its outputs connected to control analog switches 74 and 75.

In operation, the one-shot multivibrator 73 has its $\overline{Q}$ output connected to the control terminal of audio channel switch 74, and its Q output connected to the control terminal of data channel switch 75. With one-shot multivibrator 73 in its quiescent or non-triggered condition, audio channel switch 74 is turned on and data channel switch 75 is turned off. Therefore, aural information output from the tape player will appear at the audio amplifier since high pass filter 71 effectively blocks any energy from one-shot miltivibrator 73, which therefore remains in its quiescent condition. When the aural instructional information stops, coded visual information appears, being in accordance with my invention in the form of a modulated 8 KHz sinusoidal carrier wave. This signal is passed by the high pass filter 71, which preferably has its lower cut off frequency on the order of 5 KHz and appears at the trigger input of one-shot multivibrator 73. The high amplitude portions of the data segments will trigger the one-shot multivibrator 73 to its not-quiescent state, thereby reversing the outputs potentials at Q and $\overline{Q}$. This action causes audio channel switch 74 to open, thereby silencing the audio channel; and causes data channel switch 75 to close, thereby passing the data from high pass filter 71 to the input of decoder input logic 110 of FIG. 5. The time constants of one shot multivibrator 73 are selected to hold in the non-quiescent state for slightly longer than the duration of a data segment. Therefore, each successive segment of data will serve to retrigger or hold one-shot multivibrator 73 in its non-quiescent condition. At the completion of a block or segment of visual instruction, the 8 KHa signal ceases. The one-shot multivibrator 73 then resets to its quiescent condition, thereby turning data channel switch 75 off and audio channel switch 74 on and the system is in condition for the next block of aural instruction.

While I have shown certain preferred devices to accomplish the separation and switching of the aural and visual tape outputs, it is within the scope and spirit of my invention to use other devices such as electrical relays, notch filters, band pass filters, and other devices obvious to one skilled in the art.

As will now be apparent, I have provided a novel means for effectively teaching the playing of a keyboard instrument, utilizing selectively operated illumination means within the keys of the keyboard, with the arrangement being such that by suitably pressing or striking the indicated keys, the player can cause certain notes to be sounded. These notes can include individual tones as well as chords composed of several tone.

By simultaneously pressing for example three or four keys of musical chord in response to the lighting of the respective illumination means, the chord will be played during the time the keys are depressed. The manner in which the bass pedals of an organ are to be played can also be indicated by lights. Similarly, for organs equipped with chord button boxes, such buttons can be illuminated to direct the playing thereof.

Due to the flexibility and speed of the binary sequential decoding system taught herein, which of course receives intelligence from a single track pre-recorded tape, I am able to provide many pleasing and educational capabilities to any ordinary electronic organ. Tapes can be selected such that the beginning musician can gradually move from the simple melodies, to playing complicated numbers involving the use of both hands as well as the feet.

Furthermore, in instruments having an automatic rhythm player provided in accordance with this invention, the rhythm player can be caused to be played in a rhythmic fashion in synchronism with the manual playing in response to data placed upon the tape.

Data may be placed on tapes such that illumination means can be caused to light individually, or in groups of any practical number, thus making it possible for the player, by following the illuminated incandescent or neon bulbs, or light emitting diodes, to play a melody with which suitable chords are properly interposed. The potential of my novel binary sequential decoding system is such that any practical number of functions can be simultaneously activated without exceeding the capability of my device. Such functions can of course include in addition to the lighting of the melody keys with the appropriate chords, the illumination of the stop tabs and switches to be manipulated by the organist and the control of the novel chord change indicating lamp to alert a beginner when a change in chord keys is imminent. Further, the operation of bass pedals coupled with the automatic provision of rhythm amounts to an arrangement designed to give pleasure and delight to almost any member of the family.

TABLE I

| | | | |
|---|---|---|---|
| $R_1$ | 100KΩ | $C_1$ | 0.1 μf |
| $R_2$ | 680 Ω | $C_2$ | 0.01μf |
| $R_3$ | 20K Ω | $C_3$ | 0.01μf |
| $R_4$ | 10K Ω | $C_4$ | 0.02μf |
| $R_5$ | 10K Ω | $C_5$ | 680 pf |

I claim:

1. A sight and sound instructional device for a musical instrument, comprising a plurality of illumination means adjacent the portions of the instrument to be contacted by the fingers of the player, control means operatively connected to said plurality of illumination means, a single track tape playing device arranged for playing a pre-recorded magnetic tape containing coded instructional information and aural instructional information both recorded on a single track on said magnetic tape, such coded instructional information and aural instructional information being superimposed on such single track, separation means connected to the output of said tape playing device and being responsive to such aural instructional information and to such coded visual instructional information, said separation means including two-channel filter means wherein a first of said channels effectively passes frequencies below a selected upper limit, and a second of said channels effectively passes frequencies higher than such upper limit and effectively rejects frequencies lower than such upper limit, said coded instructional information being limited to frequencies above such upper limit, and decoder means connected to the output of said second channel, said decoder means being responsive to modulated segments of a sinusoidal carrier wave, said carrier wave having a frequency higher than such selected upper limit, said decoder means having input means such that said decoder means responds to pre-recorded information supplied thereto, where such pre-recorded information is modulated segments of said sinusoidal carrier wave, said decoder means operatively connected to said control means, thereby selectively causing the illumination of said plurality of illumination means singly and in various combinations and sequences for instruction of the player as determined by such instructional information, and simultaneously providing aural instruction to the player related to such illumination.

2. A sight and sound instructionsl device for a musical instrument, comprising a plurality of illumination means adjacent the portions of the instrument to be contacted by the fingers of the player, control means operatively connected to said plurality of illumination means, a single track tape playing device arranged for playing a pre-recorded magnetic tape containing coded instructional information and aural instructional information both recorded on a single track on said magnetic tape, such coded instructional information and aural instructional information being superimposed on such single track, separation means connected to the output of said tape playing device for separating said coded instruction information and said aural instructional information, said separation means comprising two-channel filter means wherein a first of said channels effectively passes frequencies below a selected upper limit, such frequencies providing intelligible voice reproduction, and effectively rejects frequencies higher than such upper limit, and a second of said channels effectively passes frequencies higher than such upper limit and effectively rejects frequencies lower than such upper limit, said coded instructional information being limited to frequencies above such upper limit, said separation means thus being responsive to such aural instructional information and to such coded visual instructional information, first output means from said separation means permanently connecting said output of said tape playing device to audio amplifier means, said amplifier means provided with loudspeaker means for audible reproduction of said separated aural instructional information, second output means from said separation means permanently connecting said output of said tape playing device to decoder means responsive to said separated coded instructional information, said decoder means being responsive to modulated segments of a sinusoidal carrier wave, said carrier wave having a frequency higher than such selected upper limit, said decoder means having input means such that said decoder means responds to pre-recorded information supplied thereto, where such pre-recorded information is modulated segments of said sinusoidal carrier wave, said decoder means being operatively connected to said control means, thereby selectively causing the illumination of said plurality of illumination means singly and in various combinations and sequences for instruction of the player as determined by such instructional information, and simultaneously providing aural instruction to the player related to such illumination.

* * * * *